United States Patent
Gonzalez et al.

(10) Patent No.: US 8,289,878 B1
(45) Date of Patent: Oct. 16, 2012

(54) VIRTUAL LINK MAPPING

(75) Inventors: Jose A. Gonzalez, Maitland, FL (US); David M. Ham, Ashburn, VA (US); Shane Lobo, Orlando, FL (US); Steve D. Parrott, Clifton, VA (US); Jonathan Rubin, Arlington, VA (US); Drew A. Shinholster, Jr., Maitland, FL (US); Todd Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 728 days.

(21) Appl. No.: 11/746,273

(22) Filed: May 9, 2007

(51) Int. Cl.
*H04L 12/28* (2006.01)

(52) U.S. Cl. .................... 370/254; 370/408

(58) Field of Classification Search .................. 370/216, 370/235, 254, 392, 395.2, 401, 408, 409; 709/223, 224, 253, 254
See application file for complete search history.

(56) References Cited

U.S. PATENT DOCUMENTS

| | | | |
|---|---|---|---|
| 5,825,775 A | 10/1998 | Chin et al. | |
| 5,898,826 A * | 4/1999 | Pierce et al. | 714/4.2 |
| 6,046,988 A | 4/2000 | Schenkel et al. | |
| 6,226,265 B1 * | 5/2001 | Nakamichi et al. | 370/235 |
| 6,393,483 B1 | 5/2002 | Latif et al. | |
| 6,570,867 B1 | 5/2003 | Robinson et al. | |
| 6,650,347 B1 | 11/2003 | Nulu et al. | |
| 6,700,967 B2 | 3/2004 | Kleinoder et al. | |
| 6,788,697 B1 | 9/2004 | Aweya et al. | |
| 6,792,273 B1 | 9/2004 | Tellinger et al. | |
| 6,813,634 B1 | 11/2004 | Ahmed | |
| 6,963,575 B1 * | 11/2005 | Sistanizadeh et al. | 370/404 |
| 6,973,042 B1 | 12/2005 | Fitzgerald | |
| 6,978,223 B2 | 12/2005 | Milliken | |
| 7,016,301 B1 | 3/2006 | Moore | |
| 7,099,305 B1 | 8/2006 | Fardid | |
| 7,099,912 B2 | 8/2006 | Ishizaki et al. | |
| 7,110,362 B2 | 9/2006 | Kato | |
| 7,143,152 B1 | 11/2006 | Elman et al. | |
| 7,213,021 B2 * | 5/2007 | Taguchi et | 1/1 |
| 7,225,139 B1 | 5/2007 | Tidwell et al. | |
| 7,376,719 B1 | 5/2008 | Shafer et al. | |
| 7,376,864 B1 | 5/2008 | Hu et al. | |
| 7,424,526 B1 | 9/2008 | Hansen et al. | |
| 7,464,152 B2 | 12/2008 | Ishizaki et al. | |
| 7,467,225 B2 | 12/2008 | Anerousis et al. | |
| 7,751,392 B1 | 7/2010 | Gonzalez et al. | |
| 7,830,816 B1 | 11/2010 | Gonzalez et al. | |
| 7,831,709 B1 | 11/2010 | Ham et al. | |
| 7,869,432 B1 | 1/2011 | Mollyn | |
| 7,904,533 B1 | 3/2011 | Gonzalez et al. | |
| 7,904,553 B1 | 3/2011 | Ham et al. | |
| 7,917,854 B1 | 3/2011 | Beaudoin et al. | |
| 7,940,676 B2 | 5/2011 | Griffin | |
| 7,983,174 B1 | 7/2011 | Monaghan et al. | |

(Continued)

OTHER PUBLICATIONS

Gonzalez, Jose, et al., "Integrated Network and Customer Database", U.S. Appl. No. 11/551,704, filed Oct. 21, 2006.

(Continued)

*Primary Examiner* — Hassan Phillips
*Assistant Examiner* — Ajay Cattungal (57) ABSTRACT

Network virtual link mapping methods and systems are disclosed. In some method embodiments, router configurations are parsed to determine virtual link information for a network. A map is derived for virtual link information associated with a customer. The map is displayed, and may be used for highlighting problem areas for a customer, recommending solutions, and reconfiguring the virtual links to address specific customer needs.

23 Claims, 6 Drawing Sheets

U.S. PATENT DOCUMENTS

| | | | |
|---|---|---|---|
| 8,139,475 | B2 | 3/2012 | Vercellone et al. |
| 2002/0022985 | A1 | 2/2002 | Guidice et al. |
| 2002/0078232 | A1 | 6/2002 | Simpson et al. |
| 2002/0087393 | A1 | 7/2002 | Philonenko |
| 2002/0101821 | A1 | 8/2002 | Feldmann et al. |
| 2002/0103631 | A1 | 8/2002 | Feldmann et al. |
| 2002/0103921 | A1 | 8/2002 | Nair et al. |
| 2002/0164007 | A1 | 11/2002 | Henits |
| 2002/0172148 | A1* | 11/2002 | Kim et al. ............. 370/216 |
| 2002/0181047 | A1 | 12/2002 | Lauder et al. |
| 2002/0186259 | A1 | 12/2002 | Meandzija et al. |
| 2003/0051195 | A1* | 3/2003 | Bosa et al. ............. 714/43 |
| 2003/0055972 | A1 | 3/2003 | Fuller et al. |
| 2003/0145072 | A1* | 7/2003 | Lau et al. ............. 709/223 |
| 2003/0154404 | A1* | 8/2003 | Beadles et al. ......... 713/201 |
| 2004/0006618 | A1* | 1/2004 | Kasai et al. ........... 709/223 |
| 2004/0010496 | A1* | 1/2004 | Behrendt et al. ......... 707/10 |
| 2004/0031059 | A1 | 2/2004 | Bialk et al. |
| 2004/0059781 | A1 | 3/2004 | Yoakum et al. |
| 2004/0064581 | A1 | 4/2004 | Shitama et al. |
| 2004/0071164 | A1 | 4/2004 | Baum |
| 2004/0139193 | A1 | 7/2004 | Refai et al. |
| 2004/0210621 | A1 | 10/2004 | Antonellis |
| 2004/0264484 | A1 | 12/2004 | Kui et al. |
| 2005/0022189 | A1* | 1/2005 | Proulx et al. ........... 718/100 |
| 2005/0027845 | A1* | 2/2005 | Secor et al. ........... 709/223 |
| 2005/0091482 | A1* | 4/2005 | Gray et al. ............. 713/151 |
| 2005/0094653 | A1* | 5/2005 | Milburn et al. ........ 370/409 |
| 2005/0240835 | A1 | 10/2005 | Dragnea et al. |
| 2006/0002401 | A1* | 1/2006 | Mukherjee et al. ..... 370/401 |
| 2006/0146694 | A1* | 7/2006 | Hamaguchi et al. .... 370/216 |
| 2006/0167703 | A1* | 7/2006 | Yakov ................. 705/1 |
| 2006/0187855 | A1* | 8/2006 | Booth et al. ........... 370/254 |
| 2006/0215577 | A1 | 9/2006 | Guichard et al. |
| 2006/0268740 | A1 | 11/2006 | Rosenberg et al. |
| 2007/0041554 | A1 | 2/2007 | Newman et al. |
| 2007/0050497 | A1* | 3/2007 | Haley et al. ........... 709/224 |
| 2007/0053368 | A1 | 3/2007 | Chang et al. |
| 2007/0250625 | A1 | 10/2007 | Titus |
| 2007/0274285 | A1 | 11/2007 | Werber et al. |
| 2007/0280241 | A1* | 12/2007 | Verma ................. 370/392 |
| 2008/0002975 | A1 | 1/2008 | Vukovic et al. |
| 2008/0317039 | A1 | 12/2008 | Satterlee et al. |
| 2009/0067324 | A1 | 3/2009 | Licardie et al. |
| 2009/0198832 | A1 | 8/2009 | Shah et al. |
| 2009/0201911 | A1 | 8/2009 | Dupertuis et al. |
| 2009/0222547 | A1* | 9/2009 | Boylan et al. .......... 709/223 |
| 2009/0296588 | A1 | 12/2009 | Nishi et al. |
| 2010/0153537 | A1 | 6/2010 | Wang et al. |
| 2010/0195489 | A1 | 8/2010 | Zhou et al. |

OTHER PUBLICATIONS

Gonzalez, Jose, et al., "Customer Link Diversity Monitoring", U.S. Appl. No. 11/620,140, filed Jan. 5, 2007.

Gonzalez, Jose, et al., "Network Access and Quality of Service Troubleshooting", U.S. Appl. No. 11/838,175, filed Aug. 13, 2007.

Ham, David M., et al., "Flexible Grouping for Port Analysis", U.S. Appl. No. 12/036,289, filed Feb. 24, 2008.

Office Action dated Mar. 2, 2009, U.S. Appl. No. 11/551,704, filed Oct. 21, 2006, 16 pages.

Final Office Action dated Aug. 13, 2009, U.S. Appl. No. 11/551,704, filed Oct. 21, 2006, 22 pages.

Office Action (Advisory Action) dated Oct. 16, 2009, U.S. Appl. No. 11/551,704, filed Oct. 21, 2006, 3 pages.

Office Action dated Dec. 31, 2009, U.S. Appl. No. 11/551,704, filed Oct. 21, 2006, 30 pages.

Office Action dated May 20, 2010, U.S. Appl. No. 11/551,704, filed Oct. 21, 2006, 33 pages.

Office Action dated Jun. 15, 2009, U.S. Appl. No. 11/620,140, filed Jan. 5, 2007, 16 pages.

Final Office Action dated Nov. 27, 2009, U.S. Appl. No. 11/620,140, filed Jan. 5, 2007, 17 pages.

Advisory Action dated Feb. 17, 2010, U.S. Appl. No. 11/620,140, filed Jan. 5, 2007, 3 pages.

Notice of Allowance dated Mar. 22, 2010, U.S. Appl. No. 11/620,140, filed Jan. 5, 2007, 10 pages.

Office Action dated Apr. 3, 2009, U.S. Appl. No. 11/838,175, filed Aug. 13, 2007, 14 pages.

Final Office Action dated Nov. 24, 2009, U.S. Appl. No. 11/838,175, filed Aug. 13, 2007, 14 pages.

Advisory Action dated Mar. 24, 2010, U.S. Appl. No. 11/838,175, filed Aug. 13, 2007, 3 pages.

Notice of Allowance dated Aug. 2, 2010, U.S. Appl. No. 11/838,175, filed Aug. 13, 2007, 20 pages.

Office Action —First Action Interview Pilot Program Pre-Interview Communication dated Apr. 2, 2010, U.S. Appl. No. 12/036,289, filed Feb. 24, 2008, 31 pages.

Notice of Allowance dated Jul. 26, 2010, U.S. Appl. No. 12/036,289, filed Feb. 24, 2008, 18 pages.

Supplemental Notice of Allowance dated Dec. 8, 2010, U.S. Appl. No. 11/551,704, filed Oct. 21, 2006.

Supplemental Notice of Allowance dated Jan. 10, 2011, U.S. Appl. No. 12/273,537, filed Nov. 18, 2008.

Ham, David M., et al., "Translating Network Data into Customer Availability", U.S. Appl. No. 12/273,537, filed Nov. 18, 2008.

Notice of Allowance dated Oct. 28, 2010, U.S. Appl. No. 11/551,704, filed Oct. 21, 2006.

Notice of Allowance dated Oct. 15, 2010, U.S. Appl. No. 12/273,537, filed Nov. 18, 2008.

Supplemental Notice of Allowance dated Nov. 12, 2010, U.S. Appl. No. 12/273,537, filed Nov. 18, 2008.

Lobo, Shane A., et al., "Service Grouping for Network Reporting," U.S. Appl. No. 12/480,681, filed Jun. 8, 2009.

Baader II, Michael Joseph, et al., "Associating Problem Tickets Based on Integrated Network and Customer Database," U.S. Appl. No. 12/546,351, filed Aug. 24, 2009.

Office Action dated Jun. 9, 2011, U.S. Appl. No. 12/480,681, filed Jun. 8, 2009.

Notice of Allowance dated Mar. 5, 2012, U.S. Appl. No. 12/480,681, filed Jun. 8, 2009.

Final Office Action dated Nov. 9, 2011, U.S. Appl. No. 12/480,681, filed Jun. 8, 2009.

Advisory Action dated Jan. 23, 2012, U.S. Appl. No. 12/480,681, filed Jun. 8, 2009.

Pre-Interview Communication dated Jun. 29, 2012, U.S. Appl. No. 12/546,351 filed on Aug. 24, 2009.

Pre-Interview Communication dated Jun. 15, 2012, U.S. Appl. No. 12/639,906 filed on Dec. 16, 2009.

Office Action—FAIPP dated Jul. 26, 2012, U.S. Appl. No. 12/639,906, filed on Dec. 16, 2009.

* cited by examiner

VIRTUAL LINK MAPPING

CROSS-REFERENCE TO RELATED APPLICATIONS

This application includes subject matter related to the following applications, which are hereby incorporated by reference: U.S. patent application Ser. No. 11/551,704, filed Oct. 21, 2006, entitled "Integrated Network and Customer Database," by Jose Gonzalez, et al.; and U.S. patent application Ser. No. 11/620,140, filed Jan. 5, 2007, entitled "Customer Link Diversity Monitoring," by Jose Gonzalez, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A virtual circuit is a communications arrangement in which data from a source node may be passed to a destination node over more than one communications network route during a single period of communication, where the switching between routes is hidden from the network customers. Virtual circuit techniques are widely used for packet-switched networks and frame relays. A virtual link, or a permanent virtual circuit, can be established as an option to allocate communication resources for repeated use between two customer nodes on a network. Virtual links are usually very seldom broken or disconnected. By configuring virtual links for customers, a network service provider can ensure that adequate resources are available for customer usage. Virtual links can be configured for a customer based on the customer's security policy, such as a need to communicate repeatedly and confidentially between offices, a district headquarters, and a regional headquarters.

A virtual private network (VPN) is a communications protocol often used by customers to communicate confidentially over a public network. VPN traffic can be carried over a public network infrastructure, such as the Internet, on top of standard protocols, or over a network service provider's private network with a defined service level agreement between the VPN customer and the VPN network service provider. A VPN can send data such as voice, data or video, or a combination of these media, across a secured and encrypted private channel, such as a virtual link, between two nodes. Each node can function as both a customer source node and a customer destination node.

Layer 2 Tunneling Protocol (L2TP) is a communications protocol used to support virtual private networks. L2TP acts like a data link layer protocol for tunneling network traffic between two nodes over an existing network, such as the Internet. Once a tunnel is established for a virtual link, the network traffic between the nodes is bidirectional. To be useful for networking, higher-level protocols are then run through the L2TP tunnel. To facilitate this, an L2TP session, or call, is established within the tunnel for each higher-level protocol such as point to point protocol. The traffic for each session is isolated by L2TP, so it is possible to set up multiple VPNs across a single tunnel or virtual link.

SUMMARY

Network virtual link mapping methods and systems are disclosed. In some method embodiments, router configurations are parsed to determine virtual link information for a network. A map is derived for virtual link information associated with a customer. The map is displayed, and may be used for highlighting problem areas for a customer, recommending solutions, and reconfiguring the virtual links to address specific customer needs.

In some system embodiments, the system includes a data retriever, a data manager, and a user interface. The data retriever retrieves router configurations. The data manager parses router configurations to identify virtual link information for each network and derives a map of virtual link information associated with a customer. The user interface displays the map.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

Virtual link mapping methods and systems are disclosed to enable efficient customer network reconfiguration and troubleshooting. In some method embodiments, router configurations are parsed to extract virtual link information for a network. Virtual link information is parsed from router configurations instead of directly from routers, thus reducing the possibility of interfering with network operations. A map of virtual link information associated with a customer is derived and displayed. The map of virtual information can depict the network configuration for a customer in a similar manner to a map of physical network elements. Unlike a map of physical network elements, the map of virtual information only depicts source nodes and destination nodes, not the many possible network routes taken by communications between the nodes. Monitoring the map can enable a network service provider to gain insights and identify potential problem areas in the network for customers. Some method embodiments highlight problem areas associated with the customer and recommend solutions. A network can have problem areas based on congested data paths and inadequate redundancy, which can be indicated by customer link diversity, misconfigured virtual links, and obsolete virtual links.

Customer link diversity, which can be calculated based on the router configurations, measures the distribution of network links between customer nodes. For example, customer link diversity can indicate if a large number of office nodes for a customer communicate through a regional headquarters node to a national headquarters node, such that the failure of the regional headquarters node can cause a communications failure to the national headquarters for the large number of office nodes. Each customer can specify target customer redundancies for various node types, such that when any calculated customer link diversity is less than its corresponding target customer redundancy, increased customer link diversity can be recommended to reduce the chances of communication failures. Usage of the disclosed methods and systems may enable greater network reliability for customers and increased market shares for the network service provider.

Figure 1:
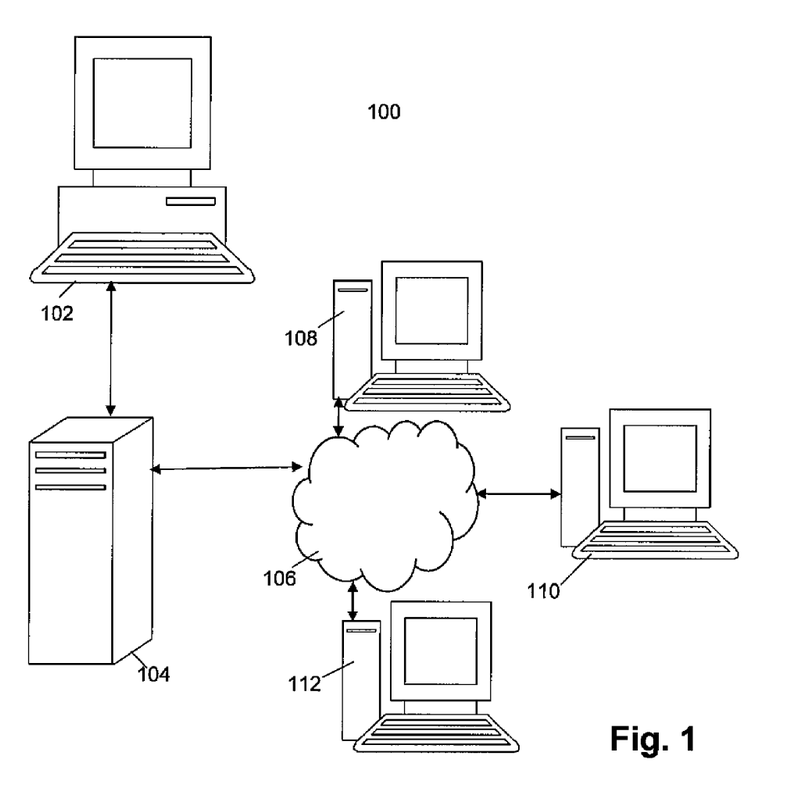
FIG. 1 shows an illustrative virtual link mapping system.

Turning now to FIG. 1, an illustrative virtual link mapping system 100 is depicted. The numbers of each type of component in the system 100 are depicted in FIG. 1 for the purpose of an illustrative example only, as the system 100 can include any number of each component type. The system 100 includes a user interface 102 and a database server 104. The user interface 102 enables a user to interface with an integrated network and customer database on the database server 104. The user can input customer data into the integrated database through the user interface 102 to the database server 104.

The database server 104 also stores data retrieved by a data retriever accessing a network 106. The data retriever retrieves network data from network elements (e.g., routers) that enable communication with network computers, such as a first customer computer 108, a second customer computer 110, and a third customer computer 112 that communicate with the network 106. The customer computers 108-112 can be computers for an office, a district headquarters, and a regional headquarters. One network can include thousands of customer computers 108-112.

Figure 2:
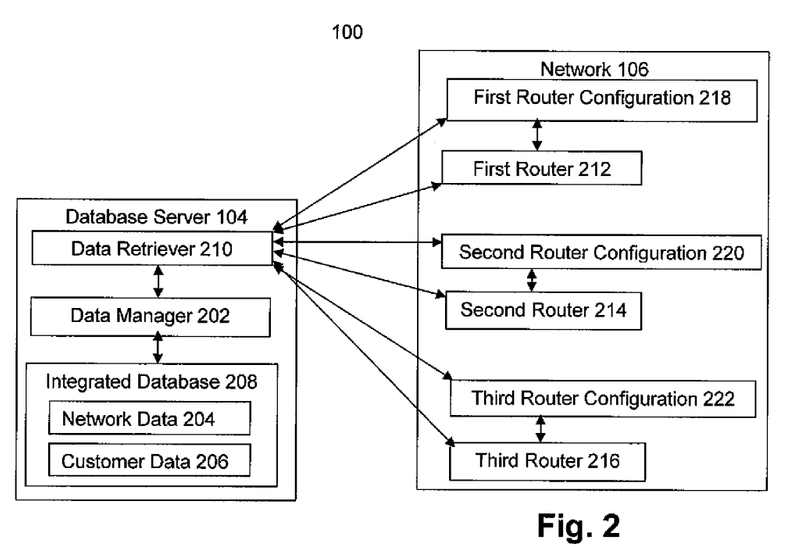
FIG. 2 shows a block diagram of an illustrative virtual link mapping system.

Turning now to FIG. 2, a block diagram of the virtual link mapping system 100 is depicted. The numbers of each type of each component in the system 100 are depicted in FIG. 2 for the purpose of an illustrative example only, as the system 100 can include any number of each component type. The database server 104 can include a data manager 202 that integrates network data 204 with customer data 206 to create an integrated database 208. A data retriever 210 retrieves router configuration data, including virtual link information for customers, from the network 106 to compile the network data 204. The router configuration data can be stored off-line in a data store as a recovery file to enable a router to recover after power outages or router maintenance Although depicted as retrieving the network data 204 from only one network, the network 106, the data retriever 210 can retrieve the network data 204 from any number of networks. The network data 204 can include data for multiple networks, with each network including any number of routers and virtual link information for each of the routers.

The data manager 202 stores virtual link information that the data retriever 210 retrieves from the network 106 in the network data 204 in the integrated database 208. The data manager 202 can receive input from a user through the user interface 102 and display the network data 204 and the customer data 206 from the integrated database 208 on the user interface 102. The data manager 202 can integrate the network data 204 from any number of networks with the customer data 206 to create the integrated database 208.

In at least some embodiments, the customer data 206 includes business information that users of the integrated database 208 can enter separately from the router configuration information. The business information can include billing plans, billing information, and customer names lists. The customer names lists includes each customer name used by a specific customer. For example, "Acme Corp." and "Acme Homes" are customer names used by the customer Acme Homes Corporation. In contrast, "Acme Elevators" may be a customer name used by a customer that is unrelated to Acme Homes Corporation. The integrated database 208 uses customer names lists to integrate the network data 204 to the corresponding customer in the customer data 206. For example, the network data 204 for "Acme Corp." and "Acme Homes" are integrated with the customer data 206 for the customer Acme Homes Corporation, but the network data 204 for "Acme Elevator" is integrated with the customer data 206 for a different customer. The integrated database 208 can present customer names from the customer names lists to a user through the user interface 102 to enable the user to select which customer names in the customer names lists correspond to which customers.

The integrated database 208 uses the customer names for a specific router with the customer names lists to determine to which customer the specific virtual link information corresponds. By determining which virtual link information corresponds to which customers, the database server 104 can respond to a selection through the user interface 102 of a specific customer listed in the customer names list by displaying the virtual link information that corresponds to the specific customer. Because a customer can communicate through multiple networks from the same location, the integrated database 208 can display the name of each corresponding network along with the virtual link information for each customer.

The system 100 includes a first router 212, the second router 214, and the third router 216. Each customer can have multiple customer computers that link to the network 106 through the routers 212-216. The network 106 can store router configuration information off-line in a backup data store for each router to enable each router to reconfigure properly following the interruption of router power, such as power outages or router maintenance. The network data 204 is compiled from the router configuration information that includes virtual link information. In contrast to physical link information, the virtual link information for each virtual link is stored as a one-ended connection that individually links a local port on one end of a connection with a remote port on the other end of the connection. The virtual link information includes local port information and both an identifier and address for the remote end of the connection. The corresponding one-ended connections are provisioned separately and stored as configuration information for separate routers. The router configuration information for the first router 212 can be stored in a file in non-volatile memory in a first router configuration 218. The first router configuration 218 can be an off-line backup data store on board the router. Similarly, the router configuration information for the second router 214 can be stored in a file in non-volatile memory in a second router configuration 220. Likewise, the router configuration information for the third router 216 can be stored in a file in non-volatile memory in a third router configuration 222. By accessing router configuration information in the router configurations 218-222, the data retriever 210 has the option of not directly accessing the routers 212-216. Not directly accessing routers reduces the possibility of interfering with router operation.

Each of the routers 212-216 forwards data packets across the network 106 toward their destinations. For example, the first router 212 sends and receives data packets for the first customer computer 118, the second router 214 sends and receives data packets for the second customer computer 110, and the third router 216 sends and receives data packets for the third customer computer 112.

Figure 3:
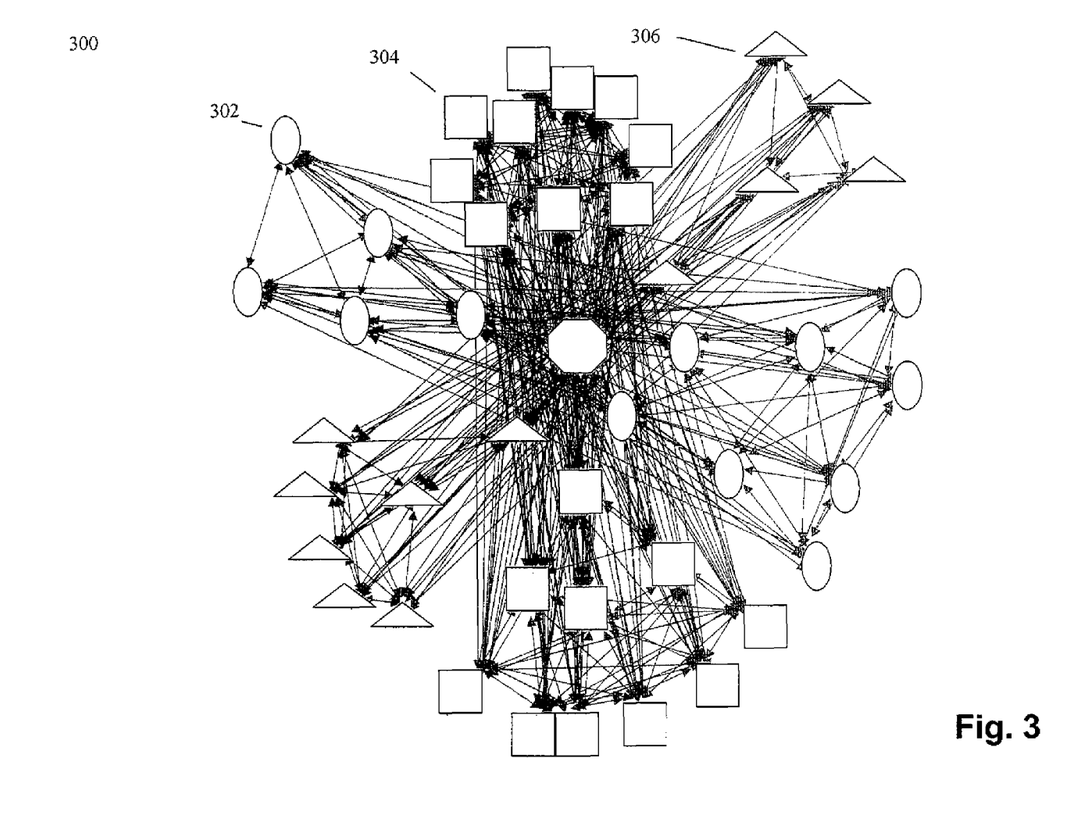
FIG. 3 shows an any-to-any network map for customers.

Turning now to FIG. 3, an any-to-any network map 300 for customers is depicted. The numbers of each type of each node in the map 300 are depicted for the purpose of an illustrative example only, as the map 300 can include any number of each node type. The map 300 includes nodes 302 for a first customer that are represented by an oval, nodes 304 for a second customer that are represented by a square, and nodes 306 for a third customer that are represented by an triangle. The nodes for each customer can represent offices, district headquarters, and regional headquarters. In a packet-switching network, each of the nodes for one customer can communicate directly with all of the nodes for the same customer. Therefore, the any-to-any network map 300 depicting the potential communication paths is quite crowded and confusing. An actual any-to-any network map would have significantly more than the three customers and the forty six customer nodes, which would make the actual any-to-any network map even more crowded and confusing then the map 300. Even isolating the nodes for one customer from the nodes for other customers would not alleviate all of the crowding and confusion in the any-to-any network map 300.

Figure 4:
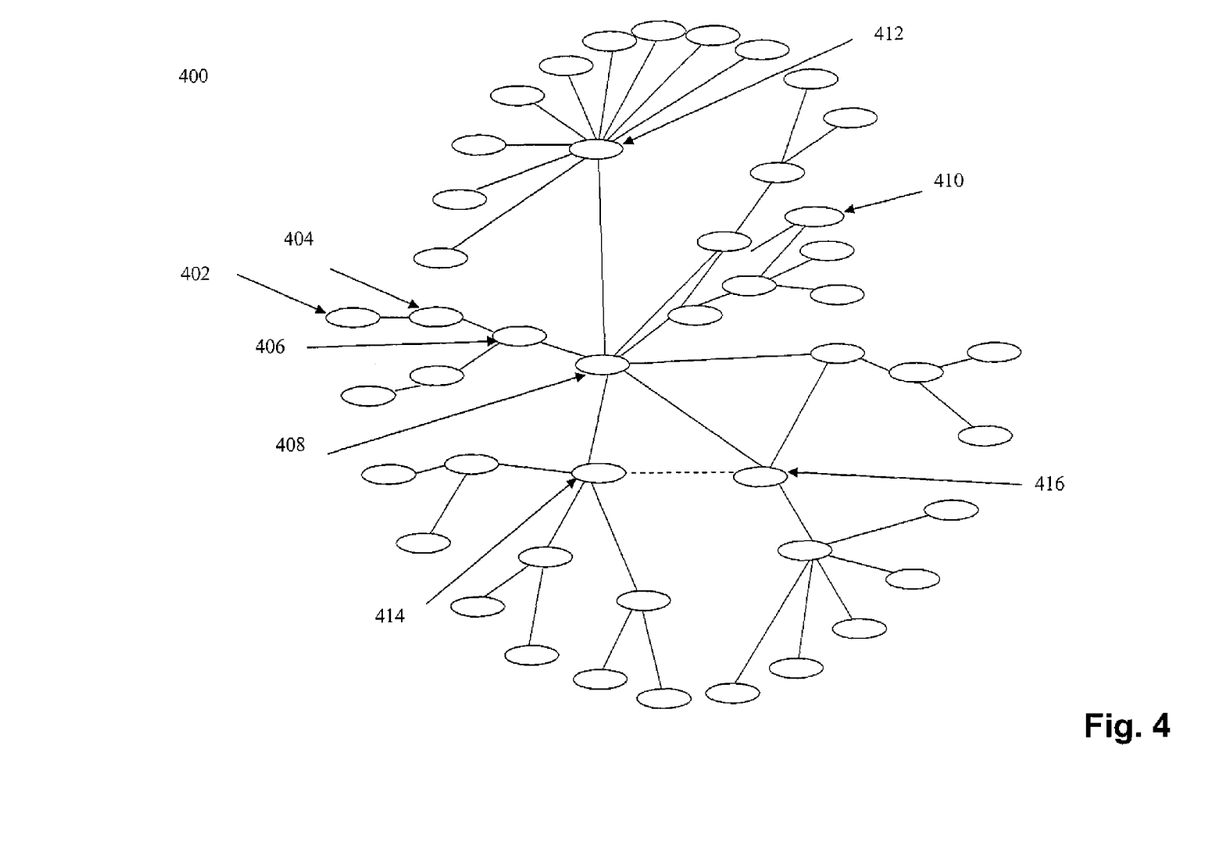
FIG. 4 shows a virtual link map for a customer according to some embodiments of the present disclosure.

Turning now to FIG. 4, a virtual link map 400 for a customer is depicted according to some embodiments of the present disclosure. The map 400 depicts the virtual links connecting communication endpoints for a customer based on a customer security policy. In the example of FIG. 4, node 402 is an office node and node 404 is a district headquarters node, where these nodes are connected by a virtual link. The node 406 is a regional headquarters node that is connected by a virtual link with the district headquarters node 404. The node 408 is a national headquarters node that is connected by a virtual link to the district headquarters node 406. Office node 410 is highlighted in a color that differs from the colors of the other nodes. The system 100 can highlight a node because the node is misconfigured or because the node has inadequate redundancy. Redundancy for a customer node is based the collective configuration of virtual links for the customer node. For example, district headquarters node 412 is a node through which nine office nodes communicate with the national headquarters node 408. Because nine office nodes communicate with the national headquarters node 408 via the virtual link between the national headquarters node 408 and the district headquarters node 412, the failure of district headquarters node 412 can cause a loss of communication with the national headquarters node 408 for all nine office nodes. Node 414 and node 416 are regional headquarters nodes that are connected by virtual links to the national headquarters node 408.

Figure 5:
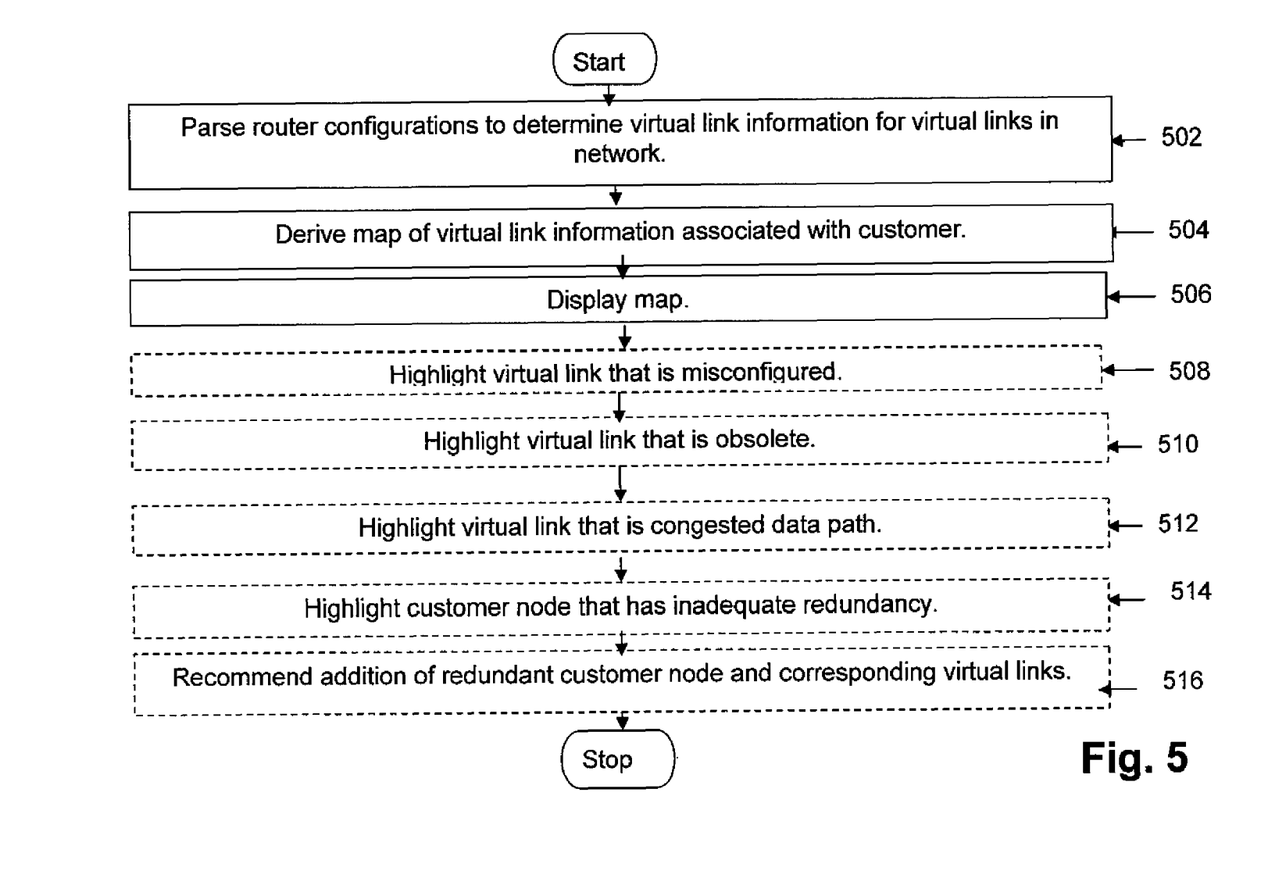
FIG. 5 shows an illustrative virtual link mapping method according to some embodiments of the present disclosure.

Turning now to FIG. 5, an illustrative integration method for virtual link mapping is depicted according to some embodiments of the present disclosure. Executing the virtual link mapping method results in the mapping and monitoring of a virtual link map for a customer.

In box 502, the data retriever 210 parses router configurations to determine virtual link information for virtual links in a network. The data retriever 210 can retrieve the router configurations from off-line backup data stores for the routers so that the on-line routers are not directly accessed during normal operations. The on-line routers can store their router configurations in the off-line backup data stores periodically, such as each day when throughput is low. The data retriever 210 can retrieve the router data and the database server 104 can parse the router data to determine virtual link information for virtual links in the network. Alternatively, the data retriever 210 can retrieve the router data and parse the router data to determine the virtual link information for virtual links in the network.

For example, parsing the first router 212 determines that the office node 402 is configured to send data to and receive data from the district headquarters node 404 by a virtual link. As another example, parsing the second router 214 determines that the district headquarters node 404 is configured to send data to and receive data from the office node 402 by a virtual link. The database server 104 integrates the router data with the customer data 206 to create the integrated database 208. The database server 104 uses the customer name for each virtual link enabled by each router in combination with a customer names list to integrate the customer data 206 with the network data 204, which includes the virtual link information. By integrating the customer data 206 with the network data 204, the database server 104 attempts to match virtual link information from both ends of each virtual link, with each end including virtual link information for a one-ended connection. Using the customer data 206 and the network data 204, the database server 104 determines where the other end of each connection should be located based on the identifier and address for the remote end of the connection specified for each one-ended connection. By attempting to match virtual link information from both ends of each virtual link, the database server 104 determines if the virtual link information is properly configured on both ends to enable each virtual link to function properly. The database server 104 stores this integrated network data 204 and customer data 206 in the integrated database 208. The integrated database 208 can include network data 204 that is current data and network data 204 that is historical data.

In box 504, the data manager 202 derives a map of virtual link information associated with a customer. For example, the data manager 202 derives the map 400 of virtual link information associated with a customer based on the integrated database 208. The data manager 202 derives the map 400 by scanning the integrated database 208 for a specified customer name and retrieving virtual link information for virtual links that are associated with the specified customer name. The data manager 202 may retrieve virtual link information for one end of a virtual link, but may not obtain matching virtual link information for the other end of the virtual link. When lacking matching virtual link information, the data manager 202 searches for virtual link information for the other end of the virtual link based on the identifier and the address specified for the remote end of the virtual link. If the search does not retrieve the virtual link information for the other end, the data manager 202 identifies the virtual link as obsolete. If the search does retrieve the virtual link information for the other end, the data manager 202 displays the virtual link information as part of the map 400, and displays an indication that the virtual link is mis-configured. A typographical error, a virtual link to another node in the customer's network, or a virtual link to a node for another customer may have caused the mis-configuration. The map 400 includes one national headquarters node, six regional headquarters nodes, ten district headquarters nodes, and twenty-nine office nodes.

The map can be a hierarchical map, a spring model map, a radial layout map, a circular layout map, or any suitable map that enable the user of the system 100 to identify potential problem areas of the network for the customer. For example, a hierarchical map is a layered drawing of a directed graph in which edges are aimed in the same direction, such as top to bottom or left to right. A spring model map uses a algorithm which is equivalent to statistical multi-dimensional scaling. A radial layout map arranges nodes on concentric rings around a focus node. A circular layout map is suitable for certain diagrams of multiple cyclical structures. A map may be based on a multi-grid solver that handles large graphs and clustered undirected graphs.

In box 506, the user interface 102 displays the map. For example, in response to a user's query, the user interface 102 displays the map 400 derived in box 504 to a user of the virtual link mapping system 100. Although the user interface 102 responds to real-time queries by the user, the data retriever 210 does not retrieve router configuration data in response to each query. However, the response to each user query does result in real-time retrievals from the integrated database 208, such that the data manager 202 attempts to match the most recent virtual link information from both ends of each virtual link identified by the query.

In box 508, the data manager 202 optionally highlights any customer nodes with a virtual link that is misconfigured. For example, the data manager 202 derives the map 400 of virtual link information associated with a customer and highlights the office node 410 in red on the map 400 because the virtual link for the office node 410 is misconfigured. The data manager 202 can determine that the virtual link for the office node 410 may be misconfigured because the configuration for the virtual link from the office node 410 to its corresponding district headquarters node does not match the configuration for the virtual link from the corresponding district headquarters node to the office node 410. The data manager 202 can recommend a solution for the misconfigured link by recommending specific configuration actions that will solve the problem, such as editing one of the nodes to match the other.

In box 510, the data manager 202 highlights a virtual link that is obsolete. For example, the data manager 202 derives the map 400 of virtual link information associated with a customer and highlights a virtual link for the office node 410 in gold on the map 400 because the virtual link is obsolete. The data manager 202 can determine that the virtual link may be obsolete because the virtual link is still configured to send data to and receive data from a district headquarters node that no longer exists. The data manager 202 can recommend a solution for the obsolete link by recommending deletion of the obsolete link.

In box 512, the data manager 202 highlights a virtual link that is a congested data path. For example, the data manager 202 derives the map 400 of virtual link information associated with a customer and highlights the virtual link from the regional headquarters node 414 to the national headquarters node 408 in blue on the map 400 because the virtual link is a congested data path. The data path from the regional headquarters node 414 to the national headquarters node 408 is categorized as congested because three district headquarter nodes communicate to the national headquarters node 408 via the regional headquarters node 414.

The user of the system 100 can specify a target number for one type of node that communicate via another type of node with the central node, such as the national headquarters node 408. For example, the user can specify that each regional headquarters node that enables communication for more than two district headquarters nodes is considered to have a congested data path. The integrated database 208 can also store these user-specified data path targets, which can include a corresponding value for each type of data path. The data path targets can be assigned by a customer or by the user of the virtual link mapping system 100 based on the needs of each customer.

The data manager 202 can recommend a solution for a congested data path by recommending the addition of a virtual link. By adding a virtual link between the regional headquarters node 414 and the regional headquarters node 416, all of the data communicated between the three district headquarters nodes directly linked to the regional headquarters node 414 and the national headquarters node 408 is not required to travel between the regional headquarters node 414 and the national headquarters node 408. The addition of the virtual link can relieve the congested data path.

In box 514, the data manager 202 highlights a customer node that has inadequate redundancy. For example, the data manager 202 derives the map 400 of virtual link information associated with a customer and highlights the district headquarters node 412 in orange on the map 400 because the district headquarters node 412 has inadequate redundancy.

The integrated database 208 can also include target customer redundancies, which can include a corresponding value for each type of the target customer redundancies. The target customer redundancies can be assigned by a customer or by the user of the virtual link mapping system 100 based on the needs of each customer. Each customer can determine the number of communication failures that can be tolerated when any one type of node fails. For example, the integrated database 208 can include individual target customer redundancies that correspond to the maximum number of communication failures that can be tolerated for each district headquarter node and each regional headquarter node for "Acme Corp." Continuing this example, "Acme Corp." can specify a target customer redundancy of five office nodes for each district headquarters node, which means the communication failure of no more than five office nodes can be tolerated when a district headquarters node fails. Likewise, "Acme Corp." can specify a target customer redundancy of six office nodes for each regional headquarters node, which means the communication failure of no more than six office nodes can be tolerated when a regional headquarters node fails. The only node in map 400 that exceeds these target customer redundancies is the district headquarters node 412 with nine office nodes.

Each customer can specify their own target customer redundancies based on requirements for the customer. The lower that a customer sets their own target customer redundancies, the more additions of redundant nodes and virtual links may need to be made to meet the low target customer redundancies, additions that may generate additional expenses for the customer. Each customer can decide how important each type of target customer redundancy is for the customer and how much the customer may be willing to pay for maintaining the target customer redundancies, and then set their own target customer redundancies accordingly. The target customer redundancies can be entered into the integrated database 208 for each customer by the customer or by the user of the virtual link mapping system 100.

In box 516, the data manager 202 recommends addition of a redundant customer node and corresponding virtual links. For example, the data manager 202 derives a map of virtual link information associated with a customer and recommends addition of a redundant customer node and corresponding virtual links for the district headquarters node 412.

By adding a redundant regional headquarters node alongside the district headquarters node 412, adding virtual links between the corresponding nine office nodes and the redundant district headquarters node, and adding a virtual link between the redundant district headquarters node and the national headquarters node 408, the nine office nodes can continue to communicate with the national headquarters node 408 and each other even if the district headquarters node 412 fails. For example, the customer security policy may require office nodes to communicate with each other via a district headquarters node. The addition of the redundant district headquarters node and the corresponding virtual links relieves the inadequate redundancy problem for the district headquarters node 412.

In some embodiments, the virtual link mapping is ongoing, and as the method is repeated periodically each potential problem area in the map is automatically evaluated when the network 106 changes, e.g., when new virtual links are added or removed. As the virtual link map changes for customers, the virtual link mapping system 100 recommends solutions for problem areas, such as addition of redundant nodes and virtual links when a changed customer link redundancy is below a target customer redundancy specified by a customer.

Figure 6:
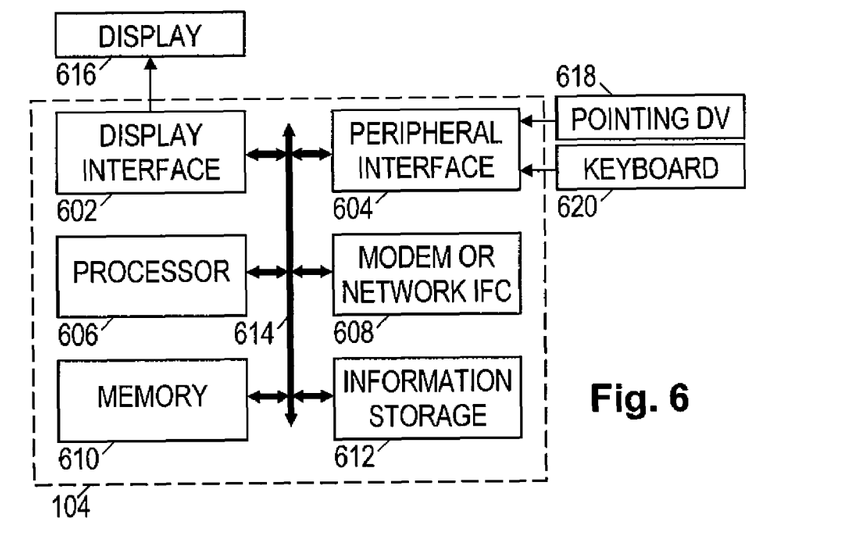
FIG. 6 shows a block diagram of an illustrative server for virtual link mapping according to some embodiments of the present disclosure.

Turning now to FIG. 6, an illustrative database server 104 for virtual link mapping is depicted. The database server 104 may comprise a display interface 602, a peripheral interface 604, a processor 606, a modem or other suitable network interface 608, a memory 610, an information storage device 612, and a bus 614. The database server 104 may be a bus-based computer, with the bus 614 interconnecting the other elements and carrying communications between them. The display interface 602 may take the form of a video card or other suitable display interface that accepts information from the bus 614 and transforms it into a form suitable for a display 616, such as a display for the user interface 102. Conversely, the peripheral interface 604 may accept signals from a keyboard 618, such as a keyboard for the user interface 102, and other input devices such as a pointing device 620, and transform them into a form suitable for communication on the bus 614. Such forms suitable for communication can include a request to display a virtual link map for a customer entered by a user of the system 100.

The processor 606 gathers information from other system elements, including input data from the peripheral interface 604, and program instructions and other data from the memory 610, the information storage device 612, or from a remote location via the network interface 608. The processor 606 carries out the program instructions and processes the data accordingly. The program instructions may further configure the processor 606 to send data to other system elements, comprising information for the user which may be communicated via the display interface 602 and the display 616, information such as a recommendation to add a redundant customer node and corresponding virtual links.

The network interface 608 enables the processor 606 to communicate with remote systems via a network. The memory 610 may serve as a low-latency temporary store of information for the processor 606, and the information storage device 612 may serve as a long term (but higher latency) store of information, including information such as a recommendation to add a redundant customer node and corresponding virtual links.

The processor 606, and hence the database server 104 as a whole, operates in accordance with one or more programs stored on the information storage device 612. The processor 606 may copy portions of the programs into the memory 610 for faster access, and may switch between programs or carry out additional programs in response to user actuation of the input device. The additional programs may be retrieved from the information storage device 612 or may be retrieved from remote locations via the network interface 608. One or more of these programs configures the database server 104 to carry out at least one of the virtual link mapping methods disclosed herein.

The database server 104 is shown as a server, although any electronic device having some amount of computing power coupled to a user interface may be configured to carry out the methods disclosed herein. Among other things, personal computers, portable computers, personal digital assistants (PDAs) and mobile phones may be configured to carry out aspects of the disclosed integrated network and customer database methods.

The display 616 for the user interface 102 is shown in FIG. 1 as a video monitor, but may take many alternative forms such as a printer, a speaker, or other means for communicating information to a user, information such as a recommendation to reassign a customer port. The input device for the user interface 102 is shown in FIG. 1 as the keyboard 620, but may similarly take many alternative forms such as a button, a mouse, a keypad, a dial, a motion sensor, a camera, a microphone or other means for receiving information from a user, information such as a request to display a virtual link map for a customer entered by a user.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for network mapping, comprising:
   parsing, by a data manager, router configurations of routers of a network service provider that facilitate communication between customer source nodes and customer destination nodes of a plurality of customers to determine virtual link information for virtual links between the customer source nodes and the customer destination nodes of the plurality of customers in a network;
   deriving, by the data manager, a map that shows virtual link lines between customer source nodes and customer destination nodes of one of the plurality of customers, wherein the map is based on virtual link information associated with the one of the plurality of customers, and wherein the map does not include nodes of physical network elements of the network service provider; and
   highlighting, by the data manager, at least one object of the derived map to identify a problem area, wherein the highlighted at least one object is selected from displayed customer source nodes, displayed customer destination nodes, and displayed virtual link lines.

2. The method of claim 1 wherein the network is a packet switched network.

3. The method of claim 1 further comprising highlighting one of a customer source node and a customer destination node with a virtual link line that is misconfigured.

4. The method of claim 1 further comprising highlighting a virtual link line that is obsolete.

5. The method of claim 1 further comprising highlighting a virtual link line that is a congested data path.

6. The method of claim 1 further comprising highlighting one of a customer source node and a customer destination node with inadequate redundancy.

7. The method of claim 6 further comprising recommending an addition of a redundant node and corresponding virtual links in response to highlighting the one of a customer source node and a customer destination node with inadequate redundancy.

8. The method of claim 1 wherein the virtual link information comprises customer bandwidth.

9. The method of claim 1 wherein the virtual links are permanent virtual circuits.

10. The method of claim 1 wherein the virtual links are based on layer two tunneling protocol.

11. The method of claim 1 wherein the virtual links are created based on a customer security policy.

12. The method of claim 1 wherein the map is one of a hierarchical map, a spring model map, a radial layout map, and a circular layout map.

13. The method of claim 1 wherein parsing router configurations comprises integrating the virtual link information with customer data to create an integrated database and wherein the customer data comprises at least one of billing plans, billing information, and customer names.

14. The method of claim 1 further comprising displaying, by a user interface, the map.

15. The method of claim 1 wherein at least some of the routers are connected to a plurality of customer source nodes and customer destination nodes of a plurality of customers.

16. The method of claim 1 wherein the router configurations are stored in one or more backup data stores.

17. The method of claim 1 wherein the map only depicts the customer source nodes and the customer destination nodes of the one of the plurality of customers.

18. A method for network mapping, comprising:
displaying, by a processor, a map showing virtual link lines between customer source nodes and customer destination nodes associated with a customer for a network, wherein the map does not include nodes of physical network elements of a network service provider;
highlighting, by the processor, a problem area on the displayed map, wherein the highlighted problem area corresponds to at least one object selected from displayed customer source nodes, displayed customer destination nodes, and displayed virtual link lines; and
recommending, by the processor, a solution for the problem area.

19. The method of claim 18 wherein the problem area is one of a misconfigured virtual link and an obsolete virtual link.

20. The method of claim 18 wherein the problem area is a virtual link that is a congested data path.

21. The method of claim 18 wherein the problem area is one of a customer source node and a customer destination node that has inadequate redundancy.

22. The method of claim 21 wherein recommending a solution for the problem area comprises recommending an addition of a redundant node and corresponding virtual links.

23. A system for network mapping, comprising: a data retriever to retrieve router configurations; a data manager to parse router configurations of routers of a network service provider that facilitate communication between customer source nodes and customer destination nodes of a plurality of customers to identify virtual link information for virtual links between the customer source nodes and the customer destination nodes of the plurality of customers in each network and to derive a map that shows virtual link lines between customer source nodes and customer destination nodes of one of the plurality of customers based on virtual link information associated with the one of the plurality of customers, wherein the map does not include nodes of physical network elements of the network service provider; and
a user interface to display the map and to highlight at least one object of the displayed map to identify a problem area, wherein the highlighted at least one object is selected from displayed customer source nodes, displayed customer destination nodes, and displayed virtual link lines.

* * * * *